US010901304B2

(12) United States Patent
Sasaki

(10) Patent No.: US 10,901,304 B2
(45) Date of Patent: Jan. 26, 2021

(54) IMAGING APPARATUS

(71) Applicant: CANON KABUSHIKI KAISHA, Tokyo (JP)

(72) Inventor: Daisuke Sasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/394,226

(22) Filed: Apr. 25, 2019

(65) Prior Publication Data

US 2019/0331986 A1 Oct. 31, 2019

(30) Foreign Application Priority Data

Apr. 27, 2018 (JP) .................. 2018-086487

(51) Int. Cl.
*G03B 17/56* (2006.01)
*G08B 13/196* (2006.01)
*G03B 17/12* (2006.01)
*G03B 17/55* (2006.01)

(52) U.S. Cl.
CPC ........... *G03B 17/561* (2013.01); *G03B 17/12* (2013.01); *G03B 17/55* (2013.01); *G08B 13/19619* (2013.01)

(58) Field of Classification Search
CPC .............................................. G08B 13/19632
See application file for complete search history.

(56) References Cited

U.S. PATENT DOCUMENTS

| 2003/0103160 | A1 | 6/2003 | Tatewaki et al. |
| 2005/0018074 | A1 | 1/2005 | Nakamoto et al. |
| 2011/0064403 | A1* | 3/2011 | Nakano .................. G03B 17/02 396/535 |
| 2012/0062789 | A1 | 3/2012 | Sasaki |
| 2016/0085069 | A1 | 3/2016 | Okamura et al. |
| 2016/0119513 | A1 | 4/2016 | Sasaki |

(Continued)

FOREIGN PATENT DOCUMENTS

| CN | 201345691 Y | 11/2009 |
| CN | 201414179 Y | 2/2010 |
| CN | 105933578 A | 3/2011 |

(Continued)

OTHER PUBLICATIONS

The above patent documents were cited in a European Search Report dated Jul. 9, 2019, that issued in the corresponding European Patent Application No. 19171049.0.

(Continued)

*Primary Examiner* — Clayton E. LaBalle
*Assistant Examiner* — Leon W Rhodes, Jr.
(74) *Attorney, Agent, or Firm* — Cowan, Liebowitz & Latman, P.C.

(57) ABSTRACT

Provided is an imaging apparatus without a dome cover, and is configured to reduce propagation of an impact that is applied from outside to a lens unit. The imaging apparatus includes: a lens unit including an imaging element and an optical system; a tilt case body configured to cover and support the lens unit; and a tilt cover configured to cover the tilt case body, wherein the tilt cover is supported by the tilt case body so as to be rotatable in a tilt direction in conjunction with the tilt case body and be movable with respect to the tilt case body.

11 Claims, 10 Drawing Sheets

(56) References Cited

U.S. PATENT DOCUMENTS

2016/0255251 A1    9/2016  Urano et al.

FOREIGN PATENT DOCUMENTS

| | | |
|---|---|---|
| CN | 102377918 A | 3/2012 |
| CN | 105933579 A | 9/2016 |
| CN | 205670794 U | 11/2016 |
| CN | 106878597 A | 6/2017 |
| CN | 107097966 A | 8/2017 |
| CN | 207039754 U | 2/2018 |
| JP | 2016-085418 A | 5/2016 |

OTHER PUBLICATIONS

The above foreign patent documents were cited in a Jul. 23, 2020 Chinese Office Action, with an English Translation, that issued in Chinese Patent Application No. 201910338325.3.

* cited by examiner

IMAGING APPARATUS

BACKGROUND OF THE INVENTION

Field of the Invention

The present invention relates to an imaging apparatus, and more particularly, to an installed type imaging apparatus having impact resistance performance.

Description of the Related Art

A related-art imaging apparatus such as a monitoring camera having impact resistance performance includes a dome cover and an exterior case. The dome cover is configured to cover a lens unit. The exterior case is configured to cover a camera main body. The dome cover is made of, for example, a polycarbonate resin having an impact resistance, whereas the exterior case is made of a metal. With such a configuration, the impact resistance performance of the monitoring camera itself is enhanced. When the dome cover made of the resin receives a large impact, a large deformation is instantaneously caused in the dome cover even though the dome cover is not broken. Thus, there exists a camera having an impact absorbing mechanism so as to prevent the deformed dome cover from being brought into contact with an internal structure such as the lens unit.

As a related-art example of the camera having the impact absorbing mechanism, there is exemplified an imaging apparatus disclosed in Japanese Patent Application Laid-Open No. 2016-85418. The imaging apparatus includes a lens unit, a dome cover, a rotation table part, and a fixed part. The lens unit includes an optical system and an imaging element. The dome cover is configured to cover the lens unit. The rotation table part is configured to support the lens unit. The fixed part is configured to support the rotation table part so that the rotation table part is rotatable in a pan direction. The imaging apparatus further includes an inner cover provided between the lens unit and the dome cover. The inner cover is elastically supported on the rotation table part. When the inner cover is pressed, the inner cover is moved in a direction away from the dome cover to be brought into contact with the fixed part.

The dome cover disclosed in Japanese Patent Application Laid-Open No. 2016-85418 covers the lens unit to function as an optical system. Therefore, especially in a telephoto lens unit or a lens unit compatible with a high pixel density, a slight error in surface accuracy of the dome cover leads to reduction in performance of a resolution. Further, in a camera including an infrared illumination, radiated infrared light is reflected on an inner surface of the dome cover. As a result, the reflected light undesirably manifests in an image, or a ghost due to the reflected light is generated. Therefore, a light-shielding mechanism is required to be additionally provided at the periphery of the lens unit.

Therefore, when the impact resistance performance and a waterproof property are provided, an exterior configuration in which the lens unit is not covered with the dome cover is desirable. In the camera that is rotatable in the pan direction and a tilt direction, however, with the exterior configuration in which the camera is not covered with the dome cover, the above-mentioned impact that is applied from outside propagates directly to the lens unit that is supported by the exterior case to undesirably damage the lens unit.

SUMMARY OF THE INVENTION

According to one embodiment of the present invention, there is provided an imaging apparatus including: a lens unit including an imaging element and an optical system; a first case configured to cover and support the lens unit; and a first cover configured to cover the first case, wherein the first cover is supported by the first case so as to be rotatable in a tilt direction in conjunction with the first case and be movable with respect to the first case.

The present invention has an object to reduce propagation of an impact that is applied from outside to a lens unit in an imaging apparatus without a dome cover.

Further features of the present invention will become apparent from the following description of exemplary embodiments with reference to the attached drawings.

DESCRIPTION OF THE EMBODIMENTS

An exemplary embodiment for carrying out the present invention is now described in detail with reference to the drawings. However, for example, the dimensions, materials, shapes, and relative positions of the components described in the following embodiment may be freely selected, and may be changed based on the configuration of the device to which the present invention is applied or based on various conditions. The same reference symbols are used to denote components that are the same as one another or functionally similar to one another among the drawings.

An imaging apparatus according to the embodiment described below includes a tilt unit, a pan unit, and a base unit. The pan unit is configured to support the tilt unit so that the tilt unit is rotatable in a tilt direction. The base unit is configured to support the pan unit so that the pan unit is rotatable in a pan direction. For convenience of description, it is assumed that the tilt unit pivots about a tilt axis extending in a horizontal direction and the pan unit pivots about a pan axis extending in a vertical direction. However, arrangements of the tilt axis and the pan axis are not limited thereto. Directions in which the tilt axis and the pan axis are actually arranged are not limited as long as the tilt axis and the pan axis are arranged so as to be orthogonal to each other. The tilt unit, the pan unit, and the base unit are described below in the stated order with reference to the drawings.

Figure 1:
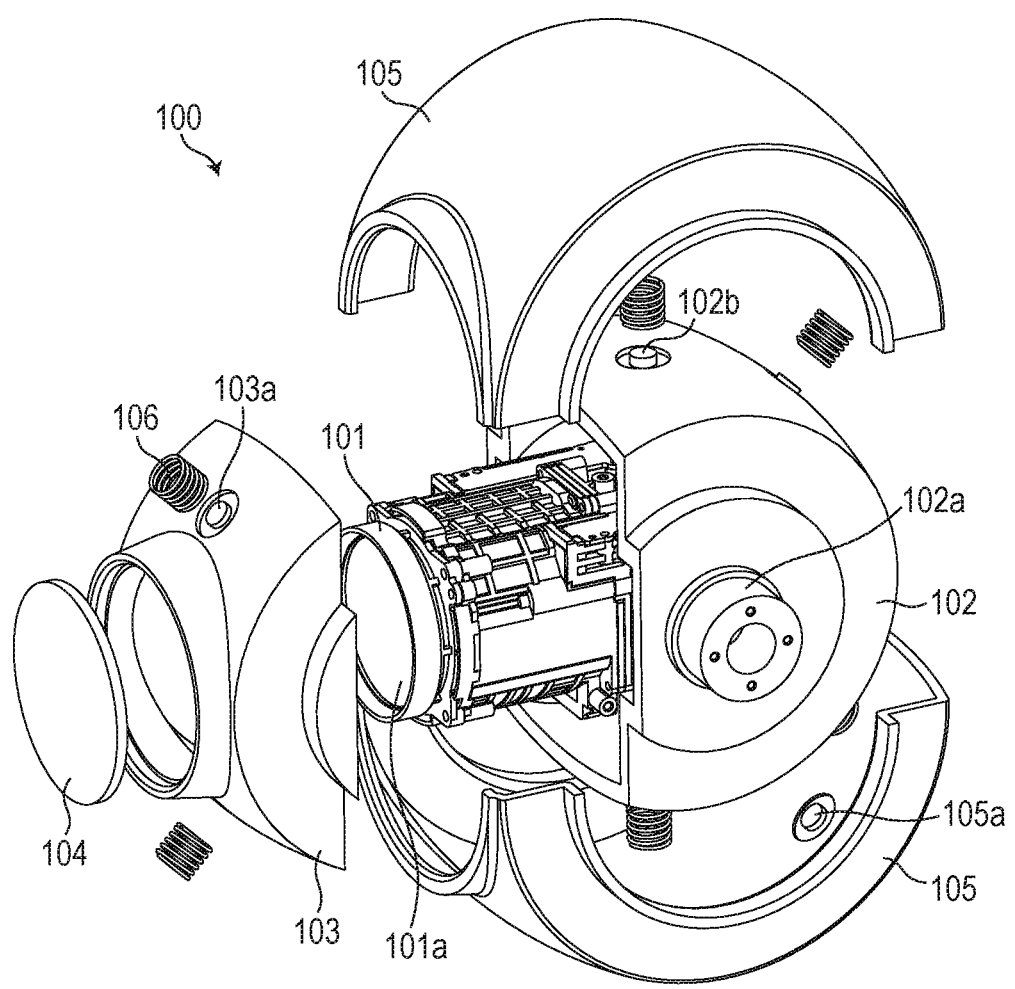
FIG. 1 is an exploded view of a tilt unit in one embodiment of the present invention.

FIG. 1 is an exploded view of a tilt unit 100 in an imaging apparatus 10 (see FIG. 6) according to one embodiment of the present invention. The tilt unit 100 includes a lens unit 101 and is supported by a pan unit 200 described later so as to be rotatable in the tilt direction. The tilt unit 100 includes the lens unit 101, a tilt case 102, a front cover 103, a front window 104, a tilt cover 105, and cover urging springs 106. The tilt case 102 forms, in cooperation with the front cover 103, an approximately cylindrical member arranged with the tilt axis serving as an axial center. Inside the approximately cylindrical member, the lens unit 101 is accommodated. More specifically, the tilt case 102 has a shape of a remaining portion after the approximately cylindrical member is cut in a direction of the tilt axis so as to be shifted from the center axis (tilt axis) thereof, whereas the front cover 103 corresponds to a cutout portion. The lens unit 101 includes an imaging element and an optical system such as a lens (both not shown). The lens unit 101 has a main configuration for imaging an imaging target, and is accommodated in the tilt case 102.

The lens unit 101 is mounted to and supported by the front cover 103. The lens unit 101 is mounted and fixed to the tilt case 102. In this manner, the lens unit 101 is accommodated in the member having the cylindrical shape, which is formed of the tilt case 102 and the front cover 103, and is mounted and fixed therein. The front cover 103 has an opening formed at a position corresponding to an imaging lens 101a of the lens unit 101. The front window 104, which is transparent, is mounted and fixed so as to close the opening. The lens unit 101 can image the imaging target in an external space through the front window 104. The tilt case 102 has tilt shaft portions 102a. The tilt shaft portions 102a are arranged on both end surfaces of the above-mentioned member having the cylindrical shape so as to have the above-mentioned tilt axis as a center axis.

The tilt cover 105 corresponds to a cylindrical member having a diameter larger than a diameter of the above-mentioned cylindrical member including the tilt case 102. The tilt cover 105 is arranged so as to cover the tilt case 102 with the same tilt axis as that of the tilt case 102 as a center. The tilt cover 105 having the cylindrical shape has openings formed in both end surfaces. Each of the openings has an inner diameter larger than an outer diameter of each of the tilt shaft portions 102a and an outer diameter of each of projecting portions 102c described later. The tilt cover 105 has annular-shaped portions 105c (see FIG. 6) projecting in the direction of the tilt axis. The annular-shaped portions 105c are formed around the openings, respectively. Although two parts separated along a cut plane that is parallel to the direction of the tilt axis are integrated to be used as the tilt cover 105 in this embodiment, the tilt cover 105 may be divided into a suitable number of parts in view of, for example, efforts required at the time of assembly.

The tilt cover 105 has an opening formed at a position corresponding to the front window 104 that is fixed to the front cover 103. The tilt case 102 has case spring installation portions 102b formed on an outer peripheral surface. Similarly, the front cover 103 has front spring installation portions 103a formed on an outer peripheral surface. The outer peripheral surface of the tilt case 102 and the outer peripheral surface of the front cover 103 form the cylindrical shape. The tilt cover 105 has cover spring installation portions 105a that are formed on an inner peripheral surface of a cylindrical portion at positions corresponding to the spring installation portions 102b and 103a described above. The cover urging springs 106 are arranged between the case spring installation portions 102b and the cover spring installation portions 105a corresponding thereto and between the front spring installation portion 103a and the cover spring installation portions 105a corresponding thereto, respectively. The tilt cover 105 is mounted over the tilt case 102 and the front cover 103 through the cover urging springs 106 therebetween. As a result, the tilt case 102 or the like elastically supports the tilt cover 105 so that the tilt cover 105 is movable with respect to the tilt shaft portions 102a. At the same time, the tilt cover 105 is supported by the tilt case 102 or the like so as to be rotatable in the tilt direction in conjunction with the tilt case 102.

Figure 2:
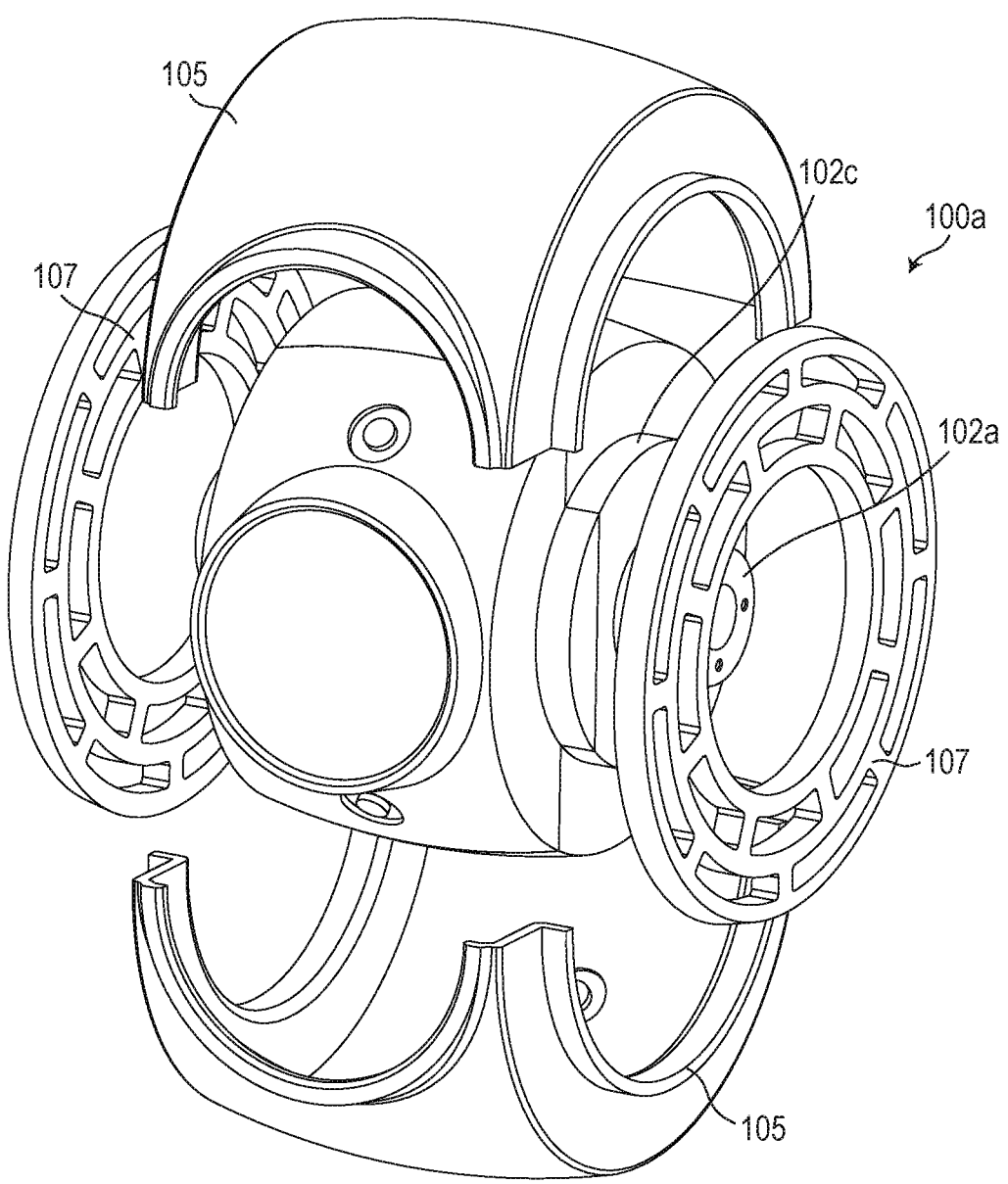
FIG. 2 is a partially exploded view for illustrating another method of elastically supporting a tilt cover.

A method of supporting the tilt cover 105 by the tilt case 102 is not limited to the method using elastic members in a mode exemplified as the above-mentioned cover urging springs 106. As another method of elastically supporting the tilt cover 105, for example, tilt elastic support members 107, each having an annular shape and being made of a material having elasticity such as a rubber, may be used, as in a tilt unit 100a illustrated in FIG. 2. Each of the tilt elastic support members 107 fits to a corresponding one of the tilt shaft portions 102a of the tilt case 102 or a corresponding one of the projecting portions 102c on a radially inner side. The projecting portions 102c, each having an annular shape, are formed on both end surfaces of the member having the cylindrical shape so as to be coaxial with the tilt axis. The tilt elastic support members 107 are fitted into the tilt cover 105 on a radially outer side so as to be mounted and fixed thereto. As a result, the tilt case 102 elastically supports the tilt cover 105 so that the tilt cover 105 is movable with respect to the tilt axis. At the same time, the tilt case 102 can support the tilt cover 105 so that the tilt cover 105 is rotatable in the tilt direction in conjunction with the tilt case 102.

Figure 3:
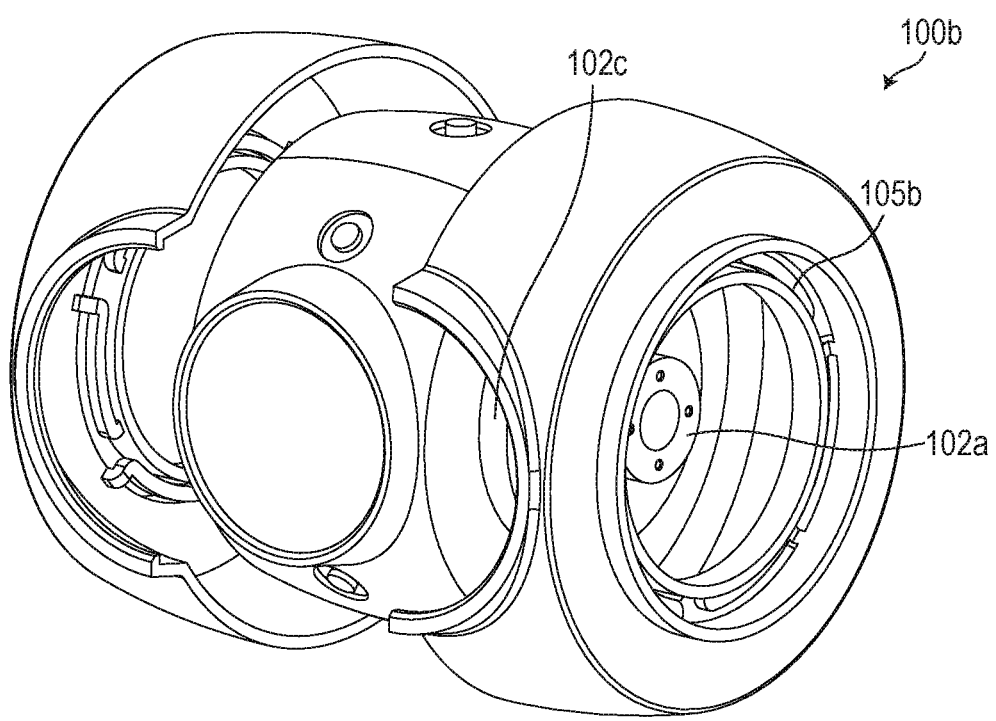
FIG. 3 is a partially exploded view for illustrating still another method of elastically supporting the tilt cover.

As another method of elastically supporting the tilt cover 105 by the tilt case 102, there is conceivable a mode in which components similar to the tilt elastic support members 107 are added to the tilt cover 105 without providing the tilt elastic support members 107 as separate members. A tilt unit 100b in this mode illustrated in FIG. 3 includes elastic portions 105b on an inner peripheral surface side of the tilt cover 105. The elastic portions 105b are easily deformable in response to an external force. The tilt cover 105 is fitted over the tilt shaft portions 102a of the tilt case 102 or the projecting portions 102c, each having the annular shape, on a radially inner side of the elastic portions 105b so as to be mounted and fixed thereto. The projecting portions 102c are formed on both end surfaces of the member having the cylindrical shape so as to be coaxial with the tilt axis. In this manner, the tilt case 102 can elastically support the tilt cover 105 so that the tilt cover 105 is movable with respect to the tilt axis. At the same time, the tilt case 102 can support the tilt cover 105 so that the tilt cover 105 is rotatable in the tilt direction in conjunction with the tilt case 102.

As described above, the tilt unit 100 in this embodiment includes the lens unit 101, a tilt case body (the tilt case 102 and the front cover 103), and the tilt cover 105. The lens unit 101 includes the imaging element configured to image the imaging target and the accompanying optical system. The tilt case body includes the tilt case 102 and the front cover 103. The tilt case body covers and supports the lens unit 101. The tilt cover 105 covers the tilt case body and rotates in the tilt direction in conjunction with the tilt case body (102, 103) and is supported so as to be movable with respect to the tilt case body (102, 103). Although it is preferred that the tilt cover 105 be supported by the tilt case body (102, 103) through the above-mentioned elastic support members, the support of the tilt cover 105 is not limited to the above-mentioned mode as long as a condition described below is satisfied. The tilt case body and the tilt cover described herein correspond to a first case and a first cover of the present invention, respectively.

The elastic support members, which are exemplified above as the cover urging springs 106, the tilt elastic support members 107, or the elastic portions 105b, are arranged between the tilt case body (102, 103) and the tilt cover 105. The tilt cover 105 is supported by the tilt case body (102, 103) with a predetermined space from the tilt case body through the elastic support members described above. The elastic support members described above are connected to the outer peripheral surface of the tilt case body having the cylindrical portion, which is exemplified as the member having the approximately cylindrical shape in this embodiment, and the inner peripheral surface of the tilt cover 105 having the cylindrical portion as an approximately cylindrical portion. The tilt case body and the tilt cover 105 may also be connected at shaft portions or annular protruding portions, which are formed at ends of the cylindrical portion, or on a region other than the ends of the cylindrical portion.

Figure 4:
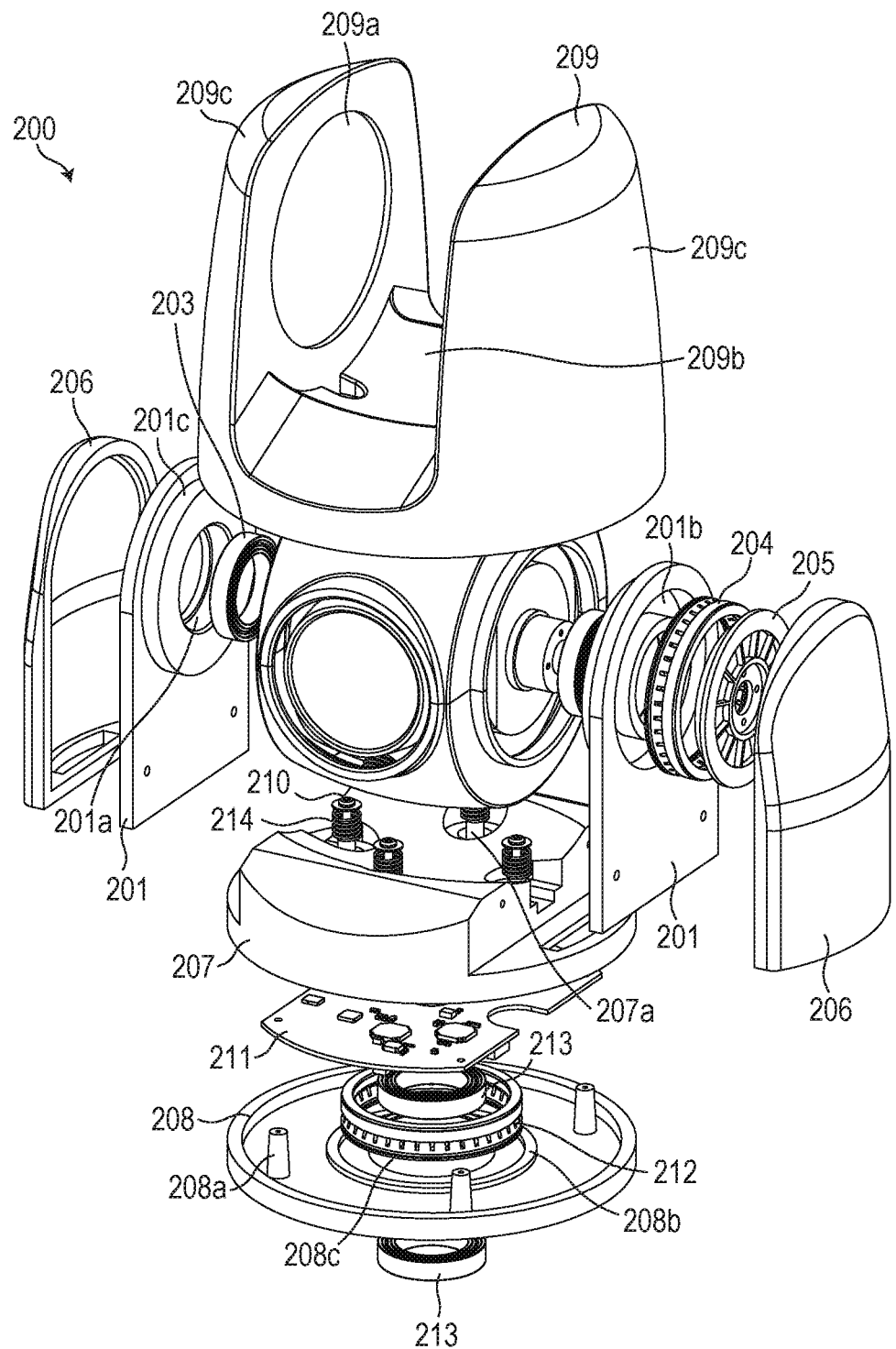
FIG. 4 is an exploded view of a pan unit in the embodiment of the present invention.

Next, FIG. 4 is an exploded view of the pan unit 200 in the imaging apparatus according to the embodiment of the present invention. The pan unit 200 is configured to support the tilt unit 100 so that the tilt unit 100 is rotatable in the tilt direction. The pan unit 200 is supported by a base unit 300 described later so as to be rotatable in the pan direction. The pan unit 200 includes tilt support tables 201, ball bearings 203, a tilt motor unit 204, a tilt motor retainer 205, and tilt side cases 206, to support the tilt unit. The pan unit 200 further includes a pan rotation table case 207, a pan cover 209, flanged screws 210, and cover urging springs 214. The pan rotation table case 207 accommodates an electric board 211, a pan motor unit 212, ball bearings 213, and a pan motor retainer 215 (see FIG. 5) therein.

The tilt unit 100 is arranged so that the tilt axis extends in the horizontal direction. The tilt shaft portions 102a arranged at both ends of the tilt unit 200 having the cylindrical shape are inserted into the ball bearings 203, respectively. The ball bearings 203 are arranged on both sides of the tilt unit 100 with the tilt axis as a center of rotation. An outer peripheral portion of each of the ball bearings 203 is fitted into a bearing hole portion 201a of a corresponding one of the tilt support tables 201. In this manner, the tilt unit 100 is supported by the tilt support tables 201 through the ball bearings 203 so as to be rotatable about the tilt axis. The tilt motor unit 204 is arranged in a corresponding one of annular recessed portions 201b respectively formed on the tilt support tables 201 so as to be coaxial with the tilt shaft portions 102a. The tilt motor unit 204 is pressed by the tilt motor retainer 205 to be fixed. The formation of the annular recessed portions 201b results in formation of annular projecting portions 201c corresponding thereto, on sides of the tilt support tables 201, which are closer to the tilt unit 100, in this embodiment. The projecting portions 201c may be eliminated. The tilt motor retainer 205 is fitted over a corresponding one of the tilt shaft portions 102a to be fixed with screws, and rotates in the tilt direction in conjunction with the tilt unit 100. Under a state in which the tilt motor unit 204 and the tilt motor retainer 205 are accommodated in the corresponding one of the annular recessed portions 201b, a corresponding one of the tilt side cases 206 is fixed to a corresponding one of the tilt support tables 201 on the outer side of the tilt motor unit 204 and the tilt motor retainer 205. The internal components described above are covered with the tilt side cases 206.

The tilt support tables 201 are fixed to the pan rotation table case 207, for example, with screws. The pan cover 209 is mounted to the pan rotation table case 207 in a mode described later to cover the pan rotation table case 207, the tilt support tables 201, and the tilt side cases 206. The pan cover 209 has an approximately cylindrical shape, which has an outer diameter to allow the above-mentioned components to be covered and extends in a direction of the pan axis. The pan cover 209 has a recessed portion formed at an upper end. The recessed portion extends in the direction of the pan axis (direction of a bottom-side end) so that the tilt unit 100 is fitted therein and is formed so as to pass through the approximately cylindrical shape in a direction orthogonal to the tilt axis and the pan axis. Inside protruding portions 209c formed on both sides, which form the recessed portion, the above-mentioned tilt support tables 201, the above-mentioned tilt side cases 206, and the components associated with the tilt support tables 201 are accommodated. A bottom portion 209b of the recessed portion has a shape that allows the pan rotation table case 207 to be covered and is fixed to the pan rotation table case 207 with the flanged screws 210 described later. Hole portions 209a are respectively formed in surfaces of the protruding portions 209c, which are opposed to each other. Each of the hole portions 209a has a hole shape that is slightly larger than each of the annular-shaped portions 105c that are coaxial with the tilt axis of the tilt cover 105.

The pan rotation table case 207 has boss-shaped portions 207a. The boss-shaped portions 207a are formed on a region opposed to a bottom-side surface (bottom surface) of the tilt unit 100 and project toward the bottom surface. Although four boss-shaped portions 207a are provided in this embodiment, the number of boss-shaped portions 207a is not limited to that of the example of this embodiment. Each of the boss-shaped portions 207a is arranged inside a radially inner portion of a corresponding one of the cover urging springs 214 so as to guide the cover urging spring 214. The flanged screws 210 can be mounted onto distal ends of the boss-shaped portions 207a, respectively. A back surface of the bottom portion 209b of the pan cover 209 (surface opposed to the pan rotation table case 207) abuts against upper ends of the cover urging springs 214. The pan cover 209 is mounted to the pan rotation table case 207 through the cover urging springs 214 with the flanged screws 210. In this manner, the pan rotation table case 207 can elastically support the pan cover 209 so that the pan cover 209 is movable with respect to the pan axis. At the same time, the pan rotation table case 207 can support the pan cover 209 so that the pan cover 209 is rotatable in the pan direction in conjunction with the pan rotation table case 207.

The pan rotation table case 207 is supported on a pan rotation table 208. The pan rotation table 208 has an approximately disc-like shape and is arranged on the side opposite to the pan cover 209 (on a lower side) in the direction of the pan axis. In a space defined between the pan rotation table 208 and the pan rotation table case 207, there are accommodated the electric board 211, the pan motor unit 212, the ball bearings 213, and the pan motor retainer 215. For example, a CPU configured to control the lens unit 101 for imaging is mounted on the electric board 211. The pan motor unit 212 causes the pan unit 200 and the tilt unit 100 to rotate in the pan direction. The pan rotation table 208 has bosses 208a, an annular-shaped portion 208b, and a bearing hole portion 208c. The bosses 208a protrude in a direction toward the pan rotation table case 207 by a predetermined height and are used to fix the electric board 211. The annular-shaped portion 208b is arranged coaxially with the pan axis, thereby supporting the pan motor unit 212. The bearing hole portion 208c is a hole portion having an inner dimeter corresponding to the ball bearings 213. The ball bearings 213 are fitted and fixed in the bearing hole portion 208c.

The above-mentioned imaging apparatus includes the pan unit 200 in addition to the tilt unit 100 described above. The pan unit 200 includes a pan case body and the pan cover 209 configured to cover the pan case body. The pan case body herein corresponds to a configuration that supports the tilt case body so that the tilt case body is rotatable in the tilt direction. The pan case body and the pan cover, which are described herein, correspond to a second case and a second cover of the present invention, respectively. In this embodiment, the pan case body includes, for example, the tilt side cases 206, and the tilt support tables 201, the ball bearings 203, the tilt motor unit 204, and the tilt motor retainer 205, which are covered with the tilt side cases 206. The pan case body further includes the flanged screws 210, the cover urging springs 214, the pan rotation table case 207, and the components covered with the pan rotation table case 207. Specifically, the pan case body includes a tilt driving portion (203 to 205) and the pan rotation table 208 (component covered with the pan rotation table case 207). The pan rotation table 208 is configured to support the tilt driving portion (203 to 205) and rotate in the pan direction. The tilt driving portion (203 to 205) supports the tilt case body (102, 103) about a tilt rotation axis to cause the tilt case body to rotate in the tilt direction. The pan cover 209 rotates in the pan direction in conjunction with the pan case body, and is supported on the pan case body, specifically, the pan rotation table case 207 that covers the pan case body so that the pan cover 209 is movable with respect to the pan case body. Although it is preferred that the pan cover 209 be supported by the pan case body through second elastic support members described later, the mode of support of the pan cover 209 is not limited thereto as long as the above-mentioned condition is satisfied.

Between the pan case body, in particular, the pan rotation table case 207 in this embodiment and the pan cover 209, the cover urging springs 214 are arranged as the second elastic support members. The pan cover 209 is supported with a second predetermined space from the pan rotation table case 207 through the cover urging springs 214. Although the spring members are used as the second elastic support members in this case, members, each having a suitable shape and being made of any one of various elastically deformable raw materials such as a rubber, for example, the elastic support members used for the tilt unit 100 described above, can be used. In this case, the second elastic support members are provided between the pan rotation table case 207 and the pan cover 209 so as to be connected therebetween. However, the arrangement of the second elastic support members is not particularly limited as long as a predetermined distance for preventing contact between the cases, for example, between the tilt side cases 206 and the pan cover 209 is obtained. In this embodiment, so-called vibration wave motors, each having an annular shape, are used for the tilt motor unit 204 and the pan motor unit 212 in view of, for example, space saving and quietness. In view of, for example, cost and an installation location of the imaging apparatus, however, another publicly-known driving system may be used. Further, although, for example, the tilt cover 105 is divided into two parts in this embodiment, each of all the structures described above may be formed of a single part or a plurality of parts in accordance with, for example, design requirements.

Figure 5:
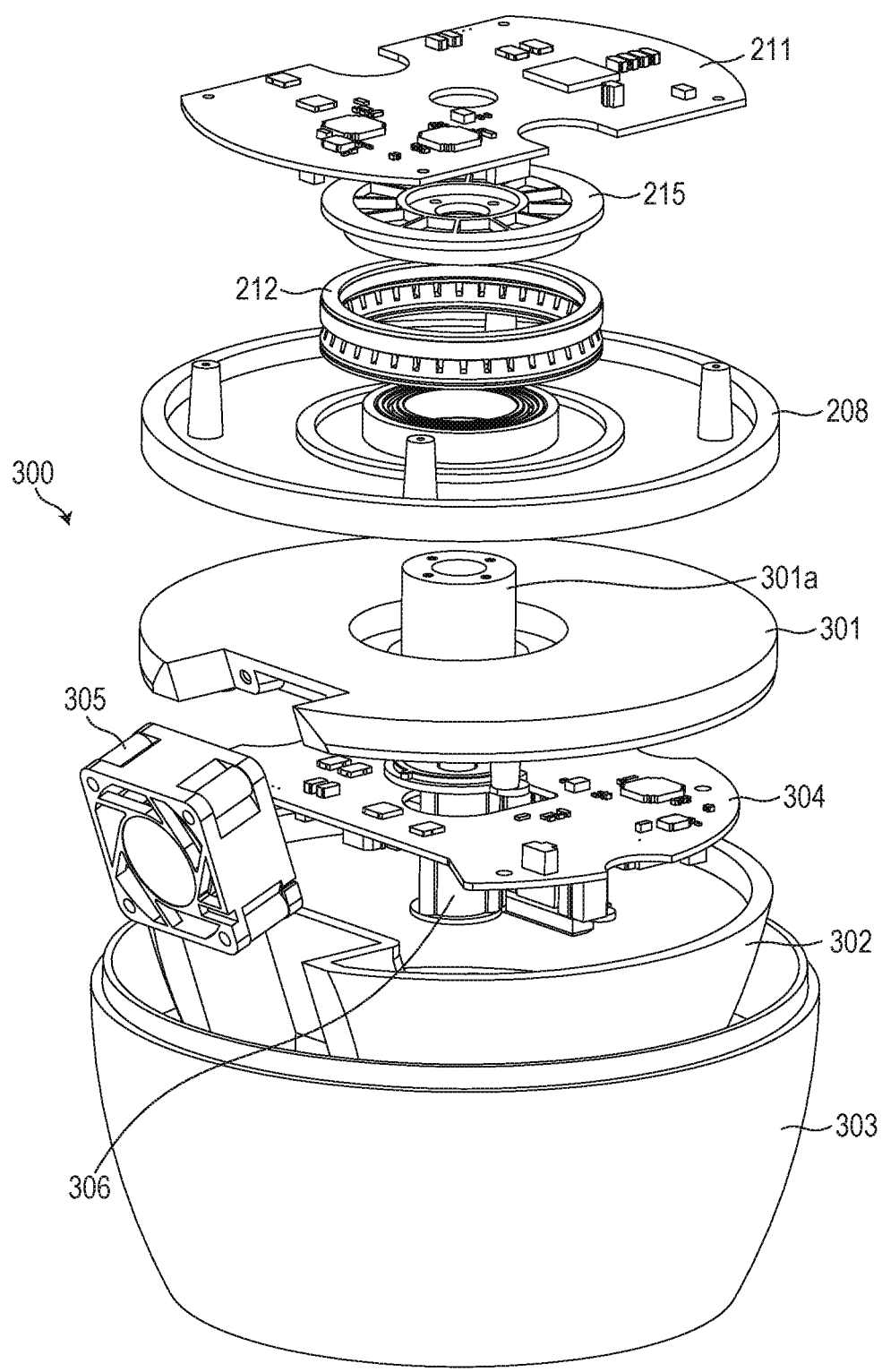
FIG. 5 is an exploded view of a base unit in the embodiment of the present invention.

The base unit 300 in this embodiment is now described with FIG. 5, which is an exploded view of the base unit 300. The base unit 300 includes a base case 301, a bottom case 302, a base cover 303, a second electric board 304, and a fan 305. The base case 301 has a hollow shaft 301a inserted into a radially inner portion of each of the ball bearings 213 that are fitted and fixed into the pan rotation table 208. The pan motor retainer 215 is fitted over and fixed to the hollow shaft 301a to fix the pan motor unit 212 while pressing the pan motor unit 212. At the same time, the hollow shaft 301a supports the pan rotation table 208 so that the pan rotation table 208 is rotatable in the pan direction.

A slip ring 306 is inserted into the hollow shaft 301a to allow signal transmission and power supply between the electric board 211 and the second electric board 304. The second electric board 304 is fixed to the base case 301 and is covered with the bottom case 302. The base cover 303 covers the bottom case 302 and the base case 301, and is fixed to and supported by the bottom case 302. The fan 305 is fixed to the base case 301, and is used to cause air to flow through a space between the cases, for example, between the base unit 300 and the pan unit 200. The fan 305 is only required to be mounted as needed.

Figure 6:
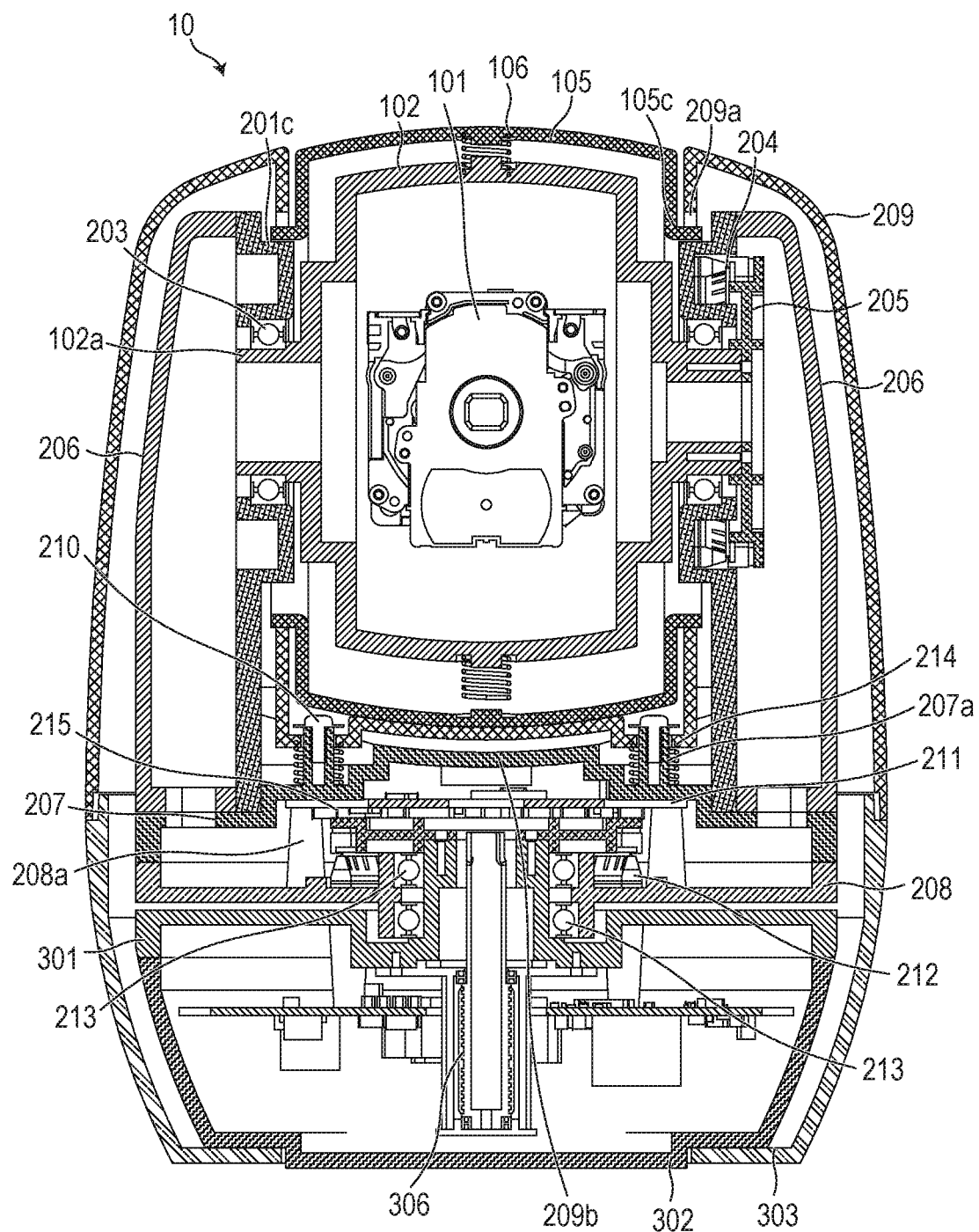
FIG. 6 is a sectional view of a camera main body in the embodiment of the present invention.

Now, details of effects obtained by the configuration of the imaging apparatus are described with reference to FIG. 6, which is a configuration sectional view of the imaging apparatus in this embodiment. Under a normal state, each of the hole portions 209a maintains a given space from a corresponding one of the annular-shaped portions 105c, which is arranged on the inner side thereof. When an external force is applied to the tilt cover 105, propagation of the external force to the lens unit 101 is reduced because of the presence of the cover urging springs 106. Hence, only the tilt cover 105 is instantaneously moved. However, when a movement amount becomes large because of the large external force, an impact is received by the pan cover 209 through contact between inner peripheral portions of the hole portions 209a and the annular-shaped portions 105c, respectively. As a result, further movement can be suppressed.

The suppression of the movement of the annular-shaped portions 105c with the inner peripheral portions of the hole portions 209a is effective against an impact applied in a direction approximately perpendicular to the tilt axis. When an impact is applied, for example, in a direction toward the base unit 300, the effect of suppressing the movement caused by the impact is obtained not only with the above-mentioned components but also through contact between the bottom portion 209b of the pan cover 209 and a surface of the tilt cover 105, which is opposed to the bottom portion 209b. In this case, a structure in which the impact is received mainly through the contact between the bottom portion 209b and the surface opposed thereto may be used instead of using the annular-shaped portions 105c and the hole portions 209a. Targets with which the above-mentioned annular-shaped portions 105c are brought into contact are not limited to the inner peripheral portions of the hole portions 209a. For example, when an impact is applied in the direction of the tilt axis, the following structure may be used. Specifically, the projecting portions 201c, which are formed on the tilt support tables 201 and are arranged coaxially with the tilt axis, are respectively brought into contact with the annular-shaped portions 105c to receive the impact.

Figure 7:
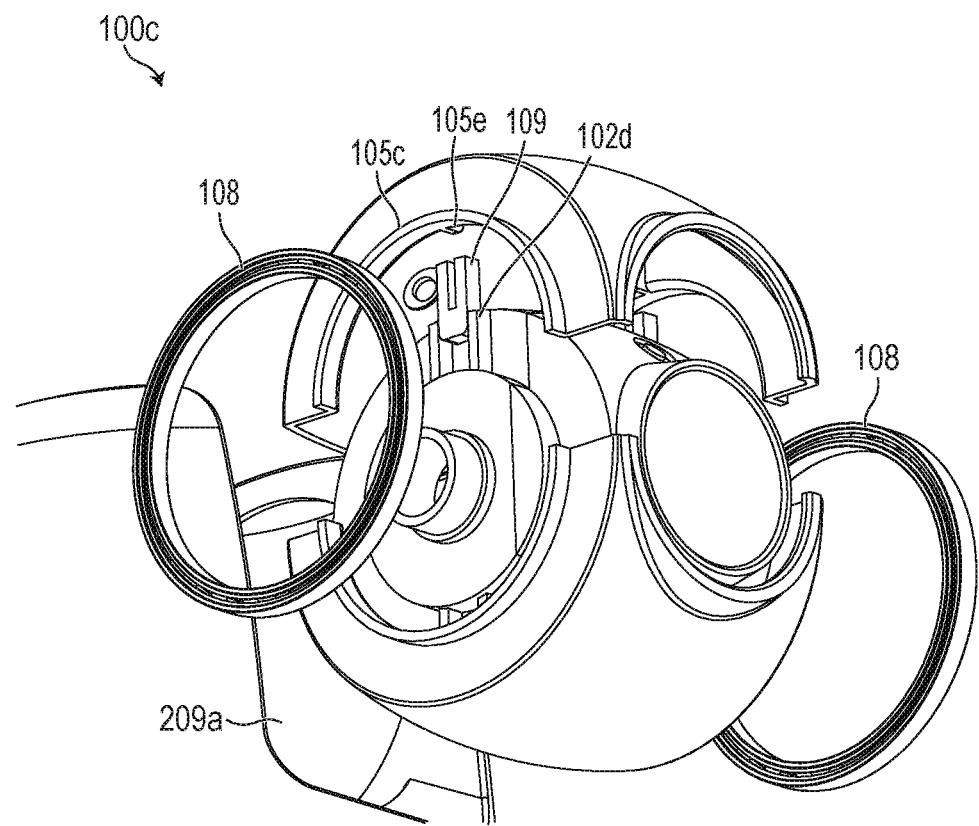
FIG. 7 is a partially exploded view for illustrating another method of supporting the tilt cover.

Another method of supporting the tilt cover 105 in the present invention is illustrated in FIG. 7. In a tilt unit 100c illustrated in FIG. 7, the tilt cover 105 is fixed to the pan cover 209 through ball bearings 108. More specifically, the tilt cover 105 is fitted to radially inner portions of the ball bearings 108 at the above-mentioned annular-shaped portions 105c. Radially outer portions of the ball bearings 108 are fitted into and fixed to the inner peripheral portions of the hole portions 209a of the pan cover 209, respectively. The tilt cover 105 has key grooves (or rib-shaped portions) 105e, whereas the tilt case 102 has rib-shaped portions (or key grooves) 102d. The key grooves (rib-shaped portions) 105e and the rib-shaped portions (key grooves) 102d are configured to match a rotating direction of the tilt cover 105 and a rotating direction of the tilt case 102, and are fitted together directly or through elastic members 109. As a result, the tilt cover 105 is supported so as to be rotatable in the tilt direction with respect to the pan cover 209 and can rotate in the tilt direction in conjunction with the tilt case 102.

As described above, the imaging apparatus according to the present invention, which is exemplified in FIG. 7, includes link members configured to couple the tilt case body (102, 103) and the tilt cover 105 to each other so that the tilt cover 105 is rotated in conjunction with the rotation of the tilt case body (102, 103) in the tilt direction. In FIG. 7, the link members are exemplified as the key grooves 105e and the rib-shaped portions 102d, which are configured to match the rotating direction of the tilt cover 105 and the rotating direction of the tilt case 102. The pan cover 209 supports the tilt cover 105 so that the tilt cover 105 is rotatable in the tilt direction through components, for example, the ball bearings 108.

Even in the configuration illustrated in FIG. 7, the impact applied to the tilt cover 105 propagates mainly to the pan cover 209 or the tilt support tables 201. Therefore, the impact propagating from the tilt cover 105 to the tilt case 102, the front cover 103, and the lens unit 101 can be alleviated.

Figure 8A:
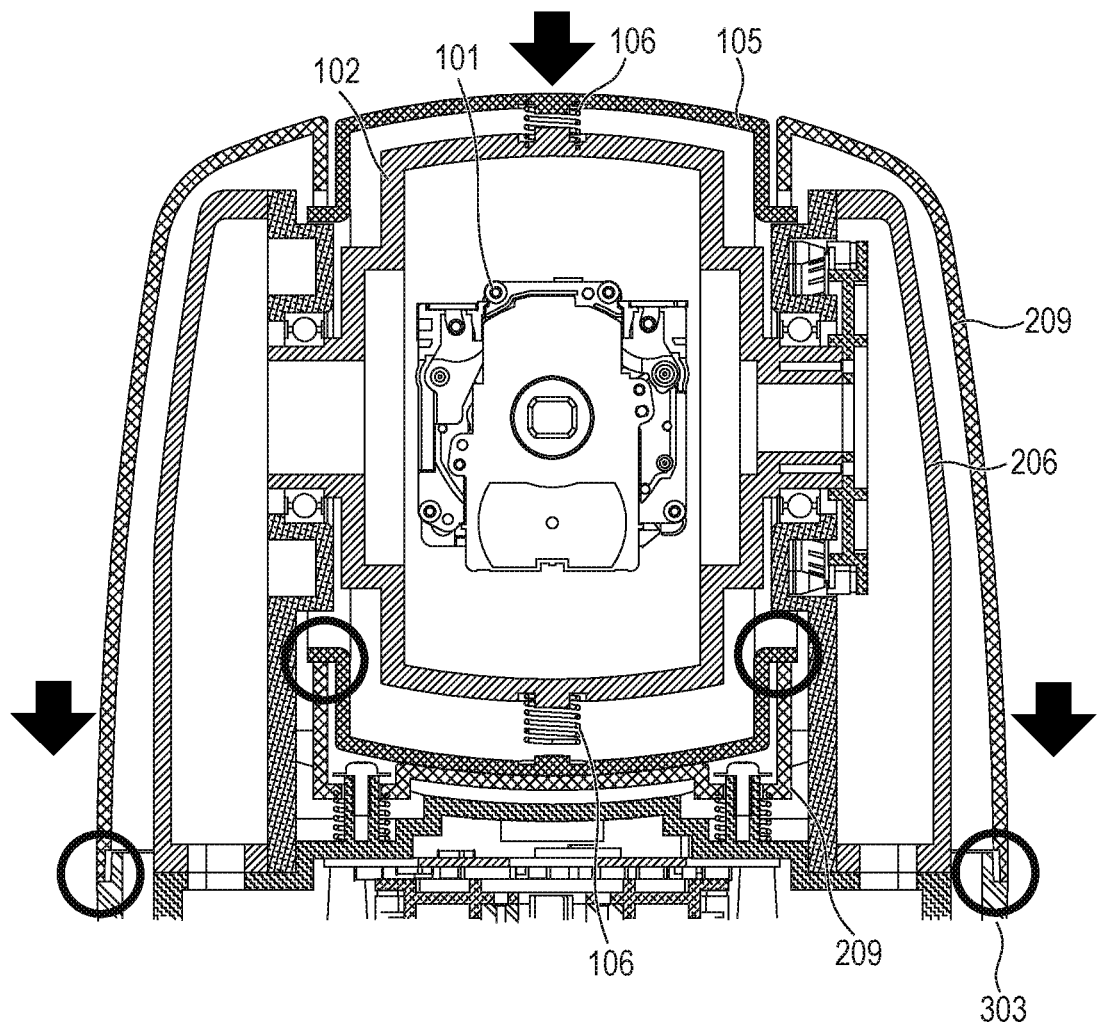
FIG. 8A is a partial sectional view for illustrating movement of each of covers when an impact is applied in the present invention.
Figure 8B:
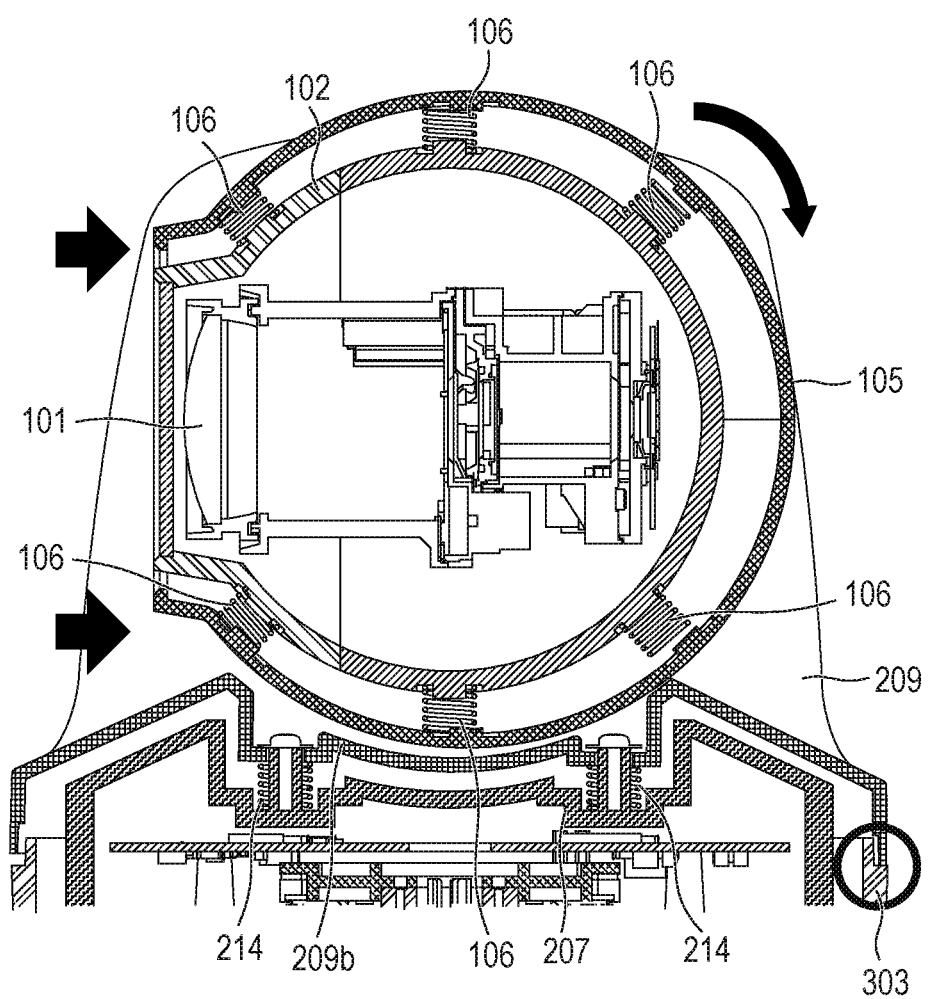
FIG. 8B is a partial sectional view for illustrating the movement of each of the covers when the impact is applied in the present invention.
Figure 8C:
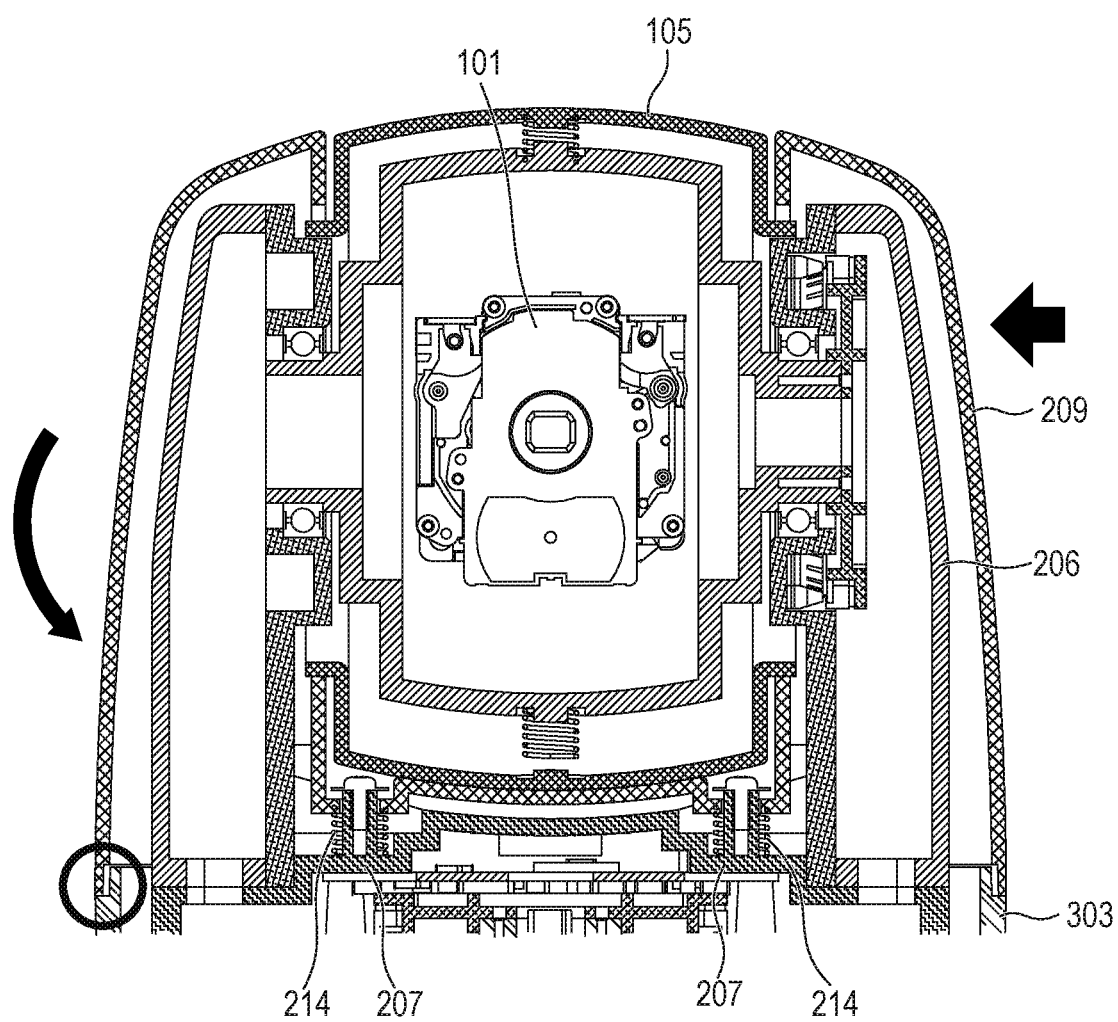
FIG. 8C is a partial sectional view for illustrating the movement of each of the covers when the impact is applied in the present invention.

Now, movement of each of the covers and contact portions when an impact is applied to the imaging apparatus 10, in particular, to the pan cover 209 and the tilt cover 105 are described with reference to FIG. 8A to FIG. 8C. FIG. 8A to FIG. 8C are illustrations of a partial cross section of the imaging apparatus 10. FIG. 8A is an illustration of a case in which the impact is applied to the tilt cover 105 from above. In the following description, a direction of the impact applied to each of the components is indicated by the arrow, and each of the contact portions is indicated by the circle in FIG. 8A to FIG. 8C. As illustrated in FIG. 8A, the tilt cover 105 is pushed by the impact applied from above to be moved downward. As a result, the tilt cover 105 is brought into contact with the pan cover 209. Next, the pan cover 209 is pushed by the tilt cover 105 to be moved downward. As a result, the pan cover 209 is brought into contact with the base cover 303. In this manner, the impact propagating to the pan cover 209 is released to the base cover 303.

In FIG. 8B, a case in which the impact is applied to the tilt cover 105 from a front side is illustrated. In FIG. 8B, a cross section of a structure of a main part of the imaging apparatus 100, which is taken along the pan axis, is schematically illustrated. The cross section illustrated in FIG. 8B is a cross section perpendicular to the cross section illustrated in FIG. 8A. As illustrated in FIG. 8B, the tilt cover 105 is first pushed by the impact applied from the front side (left side in FIG. 8B) to be moved to a far side (right side in FIG. 8B). As a result, the tilt cover 105 is brought into contact with a slope of the pan cover 209, which is located on the far side. The slope is formed of a recessed surface corresponding to an outer peripheral surface of the tilt cover 105. Next, the pan cover 209 is pushed by the tilt cover 105 to be inclined toward the far side with a distal end of one of the boss-shaped portion 207a, which is located on the far side, as a fulcrum. As a result, a far-side end of the pan cover 209 is brought into contact with the base cover 303. In this manner, the impact propagating to the pan cover 209 is released to the base cover 303.

Next, a case in which the impact is applied to a side surface of the pan cover 209 is illustrated in FIG. 8C. When the impact is applied to the side surface of the pan cover 209 as illustrated in FIG. 8C, the pan cover 209 is pushed in a lateral direction to incline the pan cover 209 with a distal end of one of the boss-shaped portions 207a, which is located on the side of the pushing position, as a fulcrum. As a result, a side region of an end of the pan cover 209 is brought into contact with the base cover 303. In this manner, the impact propagating to the pan cover 209 is released to the base cover 303.

In the embodiment described above, when an excessive impact propagates to the pan cover 209, the pan cover 209 is moved or changes a posture thereof to be brought into contact with the base cover 303. However, a mode of the present invention is not limited to the above-mentioned mode. For example, a projecting portion (not shown) may be additionally formed on the pan cover 209 so that the movement of the pan cover 209 is restricted through contact between the projecting portion and the base case 301 or the bottom case 302.

In the above-mentioned imaging apparatus, when the tilt cover 105 receives the external force, the tilt cover 105 is moved with respect to the tilt case body (102, 103) with the actions of the cover urging springs 106. At this time, the tilt cover 105 is brought into contact with the pan case body or the pan cover 209 so that movement of the tilt cover 105 is restricted. At the same time, the external force received by the tilt cover 105 is propagated to the pan case body or the pan cover 209. In other words, the tilt cover 105 has such a shape that enables the tilt cover 105 to be first brought into contact with the pan case body or the pan cover 209 when the tilt cover 105 is moved with respect to the tilt case body (102, 103) with the external force. In this manner, direct influence of the external force received by the tilt cover 105 on the tilt case body (102, 103) can be reduced.

Further, as described above, the predetermined (given) space is defined between an inner periphery of each of the hole portions 209a of the pan cover 209 and an outer periphery of the corresponding one of the annular-shaped portions 105c of the tilt cover 105, which are arranged coaxially with the hole portions 209a on the tilt axis. When the tilt cover 105 receives the external force to be moved with respect to the tilt case body (102, 103), the annular-shaped portions 105c (annular projecting portions) are brought into contact with the inner peripheries of the hole portions 209a after the tilt cover 105 is moved by an amount corresponding to the space. As a result, the restriction of the movement and the propagation of the external force to the pan cover 209 are achieved. However, establishment of the structural relationship described above is not limited to that between the pan cover 209 and the tilt cover 105. The structural relationship may also be established between the tilt cover 105 and the tilt side cases 206. Further, the arrangement of the annular-shaped portions and the arrangement of the hole portions into which the annular-shaped portions are to be fitted are interchangeable. Specifically, one of the pan case body or the pan cover 209 and the tilt cover 105 is only required to have the hole portions that are arranged coaxially with the tilt rotation axis, whereas another thereof is only required to have the annular projecting portions, each being arranged with a predetermined space from the inner periphery of a corresponding one of the hole portions. The tilt cover has a range of movement defined by a difference between an inner diameter of each of the hole portions and an outer diameter of each of the annular projecting portions so that the movement of the tilt cover is restricted through the contact between the inner peripheries of the hole portions and the outer peripheries of the annular-shaped portions, respectively.

The above-mentioned imaging apparatus further includes the base case body, which is configured to support the pan case body so that that the pan case body is rotatable in the pan direction, and the base cover 303 configured to cover the base case body. In this embodiment, the base case body includes, for example, the base case 301, the bottom case 302, the base cover 303, and the second electric board 304. In addition to the components described above, for example, a pan motor unit may be provided. In the imaging apparatus described above, when the pan cover 209 receives the external force, the pan cover 209 is moved with respect to the pan case body with the actions of the cover urging springs 214. At this time, the pan cover 209 is brought into contact with the base case body or the base cover 303 so that movement of the pan cover 209 is restricted. At the same time, the external force received by the pan cover 209 is propagated to the above-mentioned components. As a result, direct influence of the external force received by the pan cover 209 on the pan case body can be reduced.

As described above, in the imaging apparatus 10 according to this embodiment, even when the tilt cover 105 is moved or deformed, the space is maintained through the elastic members between the tilt cover 105, and the tilt case 102 and the front cover 103. Further, the spaces, which allow the movement or the deformation of each of the covers, are defined between the pan cover 209, and the tilt side cases 206 and the pan rotation table case 207 and between the base cover 303, and the base case 301 and the bottom case 302. The spaces also function as heat-insulating layers. Therefore, the tilt cover 105, the pan cover 209, and the base cover 303 may additionally have a sunshade function of preventing transfer of heat generated by direct sunlight to the components accommodated inside.

In this embodiment, the fan 305 is mounted to the base case 301. As a result, the air can be caused to flow through the spaces between the covers described above and the internal components. As described above, the tilt cover 105, the pan cover 209, and the base cover 303 cover the internal components with the given spaces therefrom. More specifically, at least any one of the space between the tilt cover 105 and the tilt case body (102, 103), the space between the pan cover 209 and the pan case body, and the space between the base cover 303 and the base case body can function as a flow path for a cooling gas. Therefore, air sent by the fan 305 flows through the spaces along the internal components so as to be able to efficiently cool the internal components.

As described above, the imaging apparatus, which has been exemplified above, has a structure without a so-called hood cover configured to protect, for example, the lens unit against an external impact. In this case, even when providing a tilt cover, the impact is liable to propagate directly to a rotary shaft and a driving component, which are configured to rotationally drive the lens unit having a camera function, and the lens unit supported by an exterior case. Therefore, there is a fear in that the rotary shaft and the driving component, and even the lens unit may be damaged by the external impact. Meanwhile, in the imaging apparatus exemplified above, the tilt cover 105 is mounted to the tilt case body (102, 103) through the elastic support members (106).

Further, with the tilt cover 105 mounted to the pan case body or the pan cover 209 so that the tilt cover 105 is rotatable, the impact can be released to the pan case body or the pan cover 209. Therefore, the impact propagating to the tilt case body is received by the tilt cover 105, and then the impact received by the tilt cover 105 is propagated to the pan cover 209 and the other components. As a result, the influence of the impact can be alleviated. Further, with the pan cover 209 mounted to the pan case body through the second elastic support members (214), the impact can be released to the base case body or the base cover (303). As a result, the impact propagating to the pan case body can also be alleviated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-086487, filed Apr. 27, 2018 which is hereby incorporated by reference herein in its entirety.

What is claimed is:

1. An imaging apparatus comprising:
a lens unit including an imaging element and an optical system;
a first case configured to cover and support the lens unit;
a second case configured to support the first case so that the first case is rotatable in a tilt direction;
a first cover configured to cover the first case; and
a second cover configured to cover the second case,
wherein the first cover is supported by the first case so as to be rotatable in the tilt direction in conjunction with the first case and be movable with respect to the first case, and
wherein, when the first cover is moved with respect to the first case by an external force, movement of the first cover is restricted by contacting with one of the second case and the second cover.

2. The imaging apparatus according to claim 1, further comprising an elastic support member to be arranged between the first case and the first cover,
wherein the first cover is supported by the first case with a predetermined space from the first case by the elastic support member.

3. The imaging apparatus according to claim 2, wherein the elastic support member is connected to an outer peripheral surface of the first case having a cylindrical portion and an inner peripheral surface of the first cover having a cylindrical portion.

4. The imaging apparatus according to claim 1,
wherein the second cover is supported so as to be rotatable in a pan direction in conjunction with the second case and be movable with respect to the second case.

5. The imaging apparatus according to claim 1, further comprising a second elastic support member to be arranged between the second case and the second cover,
wherein the second cover is supported with a predetermined space from the second case by the elastic support member.

6. The imaging apparatus according to claim 5,
wherein the second case includes:
a tilt driving portion configured to support the first case by a tilt rotation axis to rotate the first case in the tilt direction; and a pan rotation table configured to support the tilt driving portion and rotate the tilt driving portion in the pan direction, and wherein the second elastic support member is connected to the pan rotation table and the second cover.

7. The imaging apparatus according to claim 1, further comprising;

link members configured to couple the first case and the first cover to rotate the first cover in conjunction with rotation of the first case in the tilt direction;

wherein the second cover supports the first cover so that the first cover is rotatable in the tilt direction.

8. The imaging apparatus according to claim 1, wherein any one of the second case or the second cover, and the first cover has a hole portion arranged coaxially with the tilt rotation axis, and another one of the second case or the second cover, and the first cover has an annular projecting portion arranged with a predetermined space from an inner periphery of the hole portion, and wherein the first cover has a range of movement defined by a difference between an inner diameter of the hole portion and an outer diameter of the annular projecting portion.

9. The imaging apparatus according to claim 1, further comprising:

a base case configured to support the second case so that the second case is rotatable in the pan direction; and a base cover configured to cover the base case, wherein, when the second cover is moved by an external force with respect to the second case, movement of the second cover is restricted through contact with one of the base case and the base cover.

10. The imaging apparatus according to claim 9, wherein at least any one of a space between the first cover and the first case, a space between the second cover and the second case, and a space between the base cover and the base case functions as a flow path for a cooling gas.

11. An imaging apparatus comprising:

a lens unit including an imaging element and an optical system;

a first case configured to cover and support the lens unit;

a second case configured to support the first case so that the first case is rotatable in a tilt direction;

a first cover configured to cover the first case; and a second cover configured to cover the second case, wherein the first cover is supported by the first case so as to be rotatable in the tilt direction in conjunction with the first case and be movable with respect to the first case, and wherein the first cover has a contact portion that contacts with one of the second case and the second cover when the first cover is moved with respect to the first case by an external force.

* * * * *